US012612322B2

(12) United States Patent
  Ye et al.

(10) Patent No.: US 12,612,322 B2
(45) Date of Patent: Apr. 28, 2026

(54) INCLINED PLATE BAFFLED A2O REACTOR WITH HIGH OXYGEN TRANSFER EFFICIENCY

(71) Applicant: Yuxi Normal University, Yuxi City (CN)

(72) Inventors: Changbing Ye, Yuxi City (CN); Jia Li, Yuxi City (CN); Zhiming Zhou, Yuxi City (CN); Lan Li, Yuxi City (CN); Ming Li, Yuxi City (CN); Jing Zhao, Yuxi City (CN); Sujie Shi, Yuxi City (CN)

(73) Assignee: Yuxi Normal University, Yuxi City (CN)

( * ) Notice: Subject to any disclaimer, the term of this patent is extended or adjusted under 35 U.S.C. 154(b) by 377 days.

(21) Appl. No.: 18/535,704

(22) Filed: Dec. 11, 2023

(65) Prior Publication Data

US 2024/0262728 A1 Aug. 8, 2024

(30) Foreign Application Priority Data

Feb. 6, 2023 (CN) .......................... 202310093074.3

(51) Int. Cl.
  *C02F 3/30* (2023.01)
  *C02F 3/00* (2023.01)
  *C02F 3/12* (2023.01)
(52) U.S. Cl.
  CPC ............ *C02F 3/308* (2013.01); *C02F 3/1215* (2013.01); *C02F 2003/008* (2013.01)
(58) Field of Classification Search
  CPC .. C02F 3/308; C02F 3/1215; C02F 2003/008; C02F 3/30; C02F 2101/105; C02F 2101/16

USPC .......................................................... 210/605
See application file for complete search history.

(56) References Cited

FOREIGN PATENT DOCUMENTS

| CN | 107522351 A | * | 12/2017 | ................ | C02F 9/00 |
| CN | 109292981 A | * | 2/2019 | ............. | C02F 3/303 |
| CN | 110143726 A | * | 8/2019 | ............ | C02F 3/1236 |
| CN | 111138024 A | * | 5/2020 | ............. | C02F 3/301 |

OTHER PUBLICATIONS

Translation of Li Feipeng (CN_107522351_A) (Year: 2017).*
Translation of Li Wei (CN_109292981_A) (Year: 2019).*
Translation of Ma Jie (CN_110143726_A) (Year: 2019).*
Translation of Haung Yong (CN_111138024_A) (Year: 2020).*

* cited by examiner

*Primary Examiner* — Ekandra S. Miller-Cruz
(74) *Attorney, Agent, or Firm* — ARC IP Law, PC; Joseph J. Mayo

(57) ABSTRACT

An inclined plate baffled A2O reactor with high oxygen transfer efficiency is proposed. The inclined plate baffled A2O reactor with high oxygen transfer includes a reactor body and a secondary sedimentation tank. The reactor body includes an anaerobic zone, an anoxic zone and a deep oxic zone which are arranged sequentially from top to bottom. An anaerobic-anoxic inclined plate is arranged between the anaerobic zone and the anoxic zone. An anoxic-oxic inclined plate is arranged between the anoxic zone and the deep oxic zone. The oxic zone communicates with the secondary sedimentation tank through a gravity pipeline. Microporous aerators are arranged at a bottom of the deep oxic zone.

10 Claims, 1 Drawing Sheet

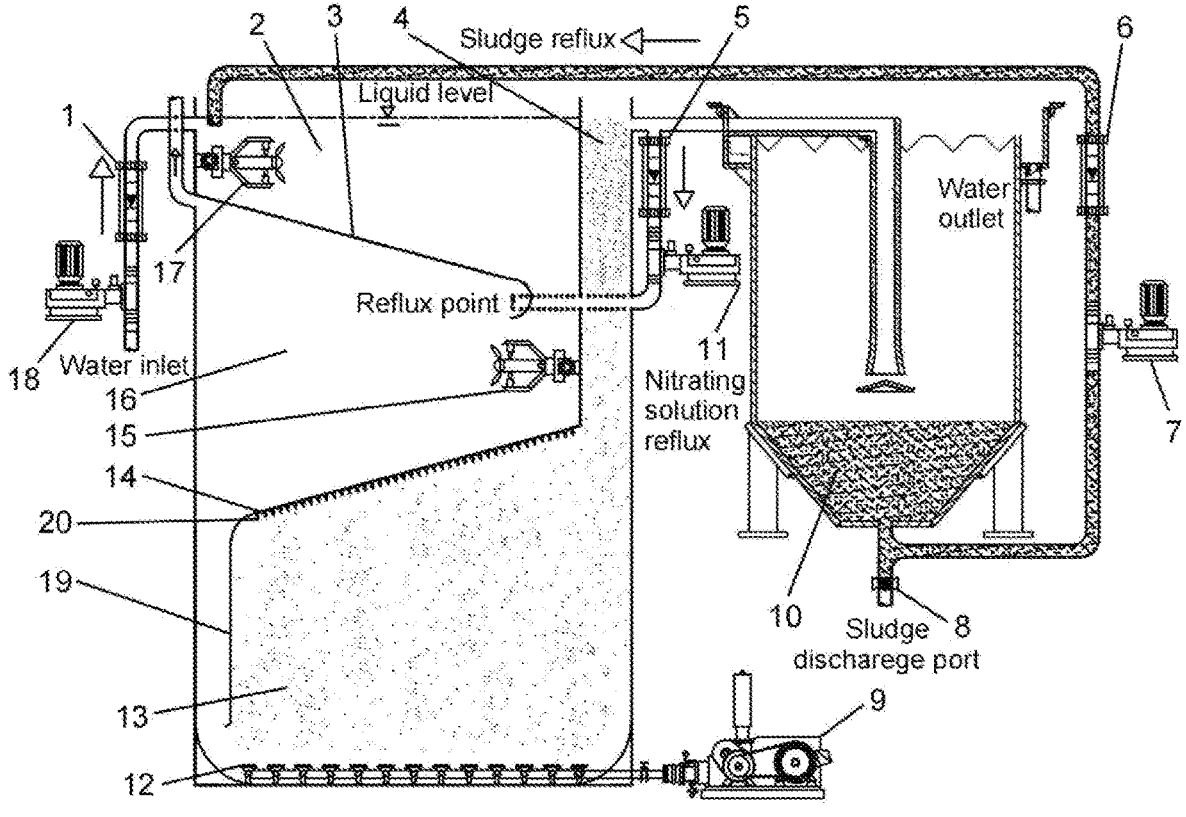

INCLINED PLATE BAFFLED A2O REACTOR WITH HIGH OXYGEN TRANSFER EFFICIENCY

CROSS-REFERENCE TO RELATED APPLICATION

This patent application claims the benefit and priority of Chinese Patent Application No. 202310093074.3 filed with the China National Intellectual Property Administration on Feb. 6, 2023, the disclosure of which is incorporated by reference herein in its entirety as part of the present application.

BACKGROUND OF THE INVENTION

Field of the Invention

The present disclosure relates to the technical field of sewage treatment equipment, in particular to an inclined plate baffled A2O (Anaeroxic-Anoxic-Oxic) reactor with high oxygen transfer efficiency.

Description of the Related Art

Biological nitrogen and phosphorus removal of sewage is mainly realized through the temporal or spatial variation of anaerobic, anoxic, and oxic environments in the system (Barnard, 1976; Irving, 1989). In the existing biological nitrogen and phosphorus removal sewage treatment processes, A2O (Anaeroxic-Anoxic-Oxic) and improved A2O are the most commonly used processes with higher nitrogen and phosphorus removal functions (Colomer, et al., 2013; Lai, et al., 2011; Liu, et al., 2013). The A2O process was developed by Rabinowitz and Marais on the basis of AO denitrification process in 1980 (Rabinowitz, et al., 1980). Since then, experts and scholars all over the world have continuously improved the theoretical level of biological nitrogen and phosphorus removal from sewage based on the basic theory of traditional biological nitrogen and phosphorus removal, and many improved A2O processes have been developed. For example, in order to solve the problem that nitrate nitrogen affects phosphorus release in an anaerobic section in the A2O process, the University of Cape Town developed UCT process (Kuba, et al., 1997; Stgaard, et al., 1997). The process significantly improved the phosphorus removal capacity of the system. Aiming at the problem of low nitrogen and phosphorus removal efficiency caused by insufficient carbon source in the system, the University of Johannesburg in South Africa developed JHB process (Bortone, et al., 1999), and ideal nitrogen and phosphorus removal effect was achieved in practical engineering. In view of the competition between denitrifying bacteria and phosphorus accumulating bacteria for limited carbon sources in the anaerobic stage, Professor Van from the Netherlands developed BCFS process (Van Loosdrecht, et al., 1997) through a reasonable carbon source diversion technology between phosphorus accumulating bacteria and denitrifying phosphorus accumulating bacteria, and stable nitrogen and phosphorus removal effect at low SVI value was achieved. Ventura, et al. integrated A2O process with other processes, and high pollutant removal efficiency under the condition of low surplus sludge yield was achieved (Ventura, et al., 2011; Hu, et al., 2013). Ren Nanqi, et al. developed HITNP process through a unique way of reflux, biofilm and activated sludge combination, and high-efficiency nitrogen and phosphorus removal under low carbon by using carbon in two purposes was achieved (Ren Nanqi, et al., 2007). Some experts and scholars in China systematically studied the pollution removal efficiency and characteristics of inverted A2O process, and the results show that this process has better nitrogen and phosphorus removal effect (Zhang Bo, et al., 2000; Zhang Jianjun, 2013).

To sum up, A2O and modified A2O processes are mature and have strong nitrogen and phosphorus removal effects in the sewage treatment process, but there are also two problems. Firstly, the process is too long in flow line, and the land area is large. Secondly, the utilization rate of oxygen transfer in the aerobic tank is low, and the operation cost is too high. The specific analysis is as follows.

SBR and A2O processes, which form anaeroxic, anoxic and oxic environments in time and space, are the most typical sewage treatment processes with simultaneous nitrogen and phosphorus removal. Existing research results and engineering application results show that A2O process has a significant nitrogen and phosphorus removal effect and is widely used in sewage treatment at present. However, the traditional A2O process is long in flow line, and only the flow line of an A2O biological purification system includes an anaerobic tank, an anoxic tank, an oxic tank and a secondary sedimentation tank. The process is long in flow line, the difficulty of management is increased, and the floor area of the treatment structure is also increased, so that the construction cost is significantly increased.

From the relationship between aeration holes and the depth, it can be seen that the depth of an aeration head is positively correlated with the oxygen transfer efficiency. Based on this relationship, some experts and scholars have developed the deepwater aeration activated sludge process, and the oxygen transfer rate is improved by using deepwater pressure. The aeration holes in the aeration tank in the traditional A2O process are at the depth of 2.5 to 3 meters, and the oxygen transfer rate is low and about 2.5% to 3%. Low oxygen transfer rate leads to high energy consumption and high operation cost.

BRIEF SUMMARY OF THE INVENTION

In order to solve the above technical problems, the present disclosure provides an inclined plate baffled A2O reactor with high oxygen transfer efficiency, so that the oxygen transfer efficiency and pollution purification efficiency of an aerobic tank in an A2O process are significantly increased by using water pressure with a larger water depth. The environmental conditions required to form an anaerobic zone, an anoxic zone and a deep oxic zone of the present disclosure are designed by inclined plates. The floor area of the present disclosure is significantly reduced.

In order to achieve the purpose, the present disclosure provides the following solution.

The present disclosure provides an inclined plate baffled A2O reactor with high oxygen transfer efficiency, including a reactor body and a secondary sedimentation tank.

The reactor body includes an anaerobic zone, an anoxic zone and a deep oxic zone which are arranged sequentially from top to bottom.

An anaerobic-anoxic inclined plate is arranged between the anaerobic zone and the anoxic zone. An end of the anaerobic-anoxic inclined plate is connected with an inner wall of a side of the reactor body. An anaerobic-anoxic communicating port is arranged between another end of the anaerobic-anoxic inclined plate and an inner wall of another side of the reactor body. The anaerobic-anoxic communicating port is configured for communicating the anaerobic zone with the anoxic zone.

An anoxic-oxic inclined plate is arranged between the anoxic zone and the deep oxic zone. An end of the anoxic-oxic inclined plate is connected with the inner wall of another side of the reactor body. An anoxic-oxic communicating port is arranged between another end of the anoxic-oxic inclined plate and the inner wall of the side of the reactor body. The anoxic-oxic communicating port is connected with a guide plate. The guide plate is configured for guiding sludge-water mixture to a bottom of the deep oxic zone to avoid the occurrence of short flow phenomenon of the sludge-water mixture in the oxic zone. The anoxic-oxic communicating port is configured for communicating the anoxic zone with the deep oxic zone.

A side, away from the anoxic-oxic communicating port, of the deep oxic zone extends upwards to a top of the reactor body to form an oxic zone.

A water inlet is provided at a side of an upper part of the anaerobic zone.

A first plug-flow stirrer is arranged at the side of the upper part of the anaerobic zone below the water inlet.

A second plug-flow stirrer is arranged on the inner wall of another side of the reactor body below the anaerobic-anoxic communicating port.

The oxic zone communicates with the secondary sedimentation tank through a gravity pipeline.

Microporous aerators are arranged at the bottom of the deep oxic zone, and the microporous aerators communicate with an air outlet end of a deepwater aeration pump.

Optionally, a nitrification liquid reflux branch is arranged on the gravity pipeline. An end of the nitrification liquid reflux branch is connected with the gravity pipeline, and another end of the nitrification liquid reflux branch extends to the anaerobic-anoxic communicating port.

Optionally, a second flow meter and a second reflux pump are arranged on the nitrification liquid reflux branch.

Optionally, a sludge discharge pipe is arranged at a bottom of the secondary sedimentation tank, and a sludge discharge valve is arranged on the sludge discharge pipe. A sludge reflux pipeline is arranged on the sludge discharge pipe above the sludge discharge valve. An end of the sludge reflux pipeline is connected with the sludge discharge pipe, and another end of the sludge reflux pipeline extends to the water inlet of the anaerobic zone.

Optionally, a third flow meter and a first reflux pump is arranged on the sludge reflux pipeline.

Optionally, the anoxic-oxic inclined plate is arranged obliquely downward from the side to another side of the reactor body.

Optionally, an included angle between the anoxic-oxic inclined plate and a horizontal plane is 15°-35°.

Optionally, the anoxic-oxic inclined plate is arranged obliquely downward from another side to the side of the reactor body.

Optionally, an included angle between the anoxic-oxic inclined plate and a horizontal plane is 15°-35°.

Optionally, a water inlet pump and a first flow meter are arranged between the water inlet and the anaerobic zone.

Compared with the prior art, the present disclosure has the following technical effects.

According to the inclined plate baffled A2O reactor with high oxygen transfer efficiency in the present disclosure, the A2O reactor is arranged in a folded plate downflow type, and the reactor is divided into an anaerobic zone, an anoxic zone and a deep oxic zone which are integrated from top to bottom. Aeration holes are arranged at the depth of 8 meters of water, and the larger water pressure can increase the oxygen transfer rate to 4%, and also the purification and degradation rate of pollutants are accelerated, so that high efficiency and low consumption are obvious. The inclined plates are designed as baffles for separating the anaerobic zone, the anoxic zone and the deep oxic zone, and have the function of gas-liquid (solid) separation. Gas escaping from the aeration tank will not affect the environmental conditions of the anaerobic/anoxic zone, and the retention and decay of activated sludge are avoided. The floor area of the A2O reactor is reduced to only half of that of the traditional A2O reactor, and the infrastructure cost is significantly reduced due to the significant reduction in floor area.

Due to the difficulty in estimating the environmental benefit and social benefit brought by the long-term high efficient and stable operation, only the infrastructure and operation costs are analyzed in the present disclosure. Compared with the traditional A2O reactor, the inclined plate baffled A2O reactor with high oxygen transfer efficiency of the present disclosure increases the oxygen transfer rate to 4% through the larger water pressure with a depth of 8 meters of water, and the aeration energy consumption can be saved by 33%. On the basis that activated sludge aeration accounts for 50% of the total energy consumption, the operation cost can be saved by 16.5%. Previous research results have shown that the inclined plate baffled A2O reactor with high oxygen transfer efficiency of the present disclosure can accelerate the purification and degradation rate of pollutants, but the relevant data of the operation cost which can be saved must be obtained through engineering practice.

During operation, the inclined plate baffled A2O reactor with high oxygen transfer efficiency developed in the present disclosure is innovatively designed with an anaerobic zone, an anoxic zone and an oxic zone which are integrated from top to bottom, the floor area of the treatment structure is reduced to only half of the traditional A2O treatment structure, and the land acquisition cost can be saved by 50%. The land acquisition cost and the migration cost varies depending on the location of the project, and the ratio of the land acquisition cost and the migration cost to the total infrastructure cost is still difficult to estimate, so that the infrastructure cost which can be saved by the inclined plate baffled A2O reactor with high oxygen transfer efficiency of the present disclosure is also difficult to evaluate.

BRIEF DESCRIPTION OF THE DRAWINGS

To describe the technical solution in the embodiments of the present disclosure or in the prior art more clearly, the following briefly introduces the attached figures to be used in the embodiments. Apparently, the attached figures in the following description show merely some embodiments of the present disclosure, and those skilled in the art may still obtain other attached figures from these attached figures without creative efforts.

FIG. 1 is a structural schematic diagram of an inclined plate baffled A2O reactor with high oxygen transfer efficiency according to an embodiment of the present disclosure.

Reference signs: 1, first flow meter; 2, anaerobic zone; 3, anaerobic-anoxic inclined plate; 4, oxic zone; 5, second flow meter; 6, third flow meter; 7, first reflux pump; 8, sludge discharge valve; 9, deepwater aeration pump; 10, secondary sedimentation tank; 11, second reflux pump; 12, microporous aerators; 13, deep oxic zone; 14, anoxic-oxic inclined plate; 15, second plug-flow stirrer; 16, anoxic zone; 17, first plug-flow stirrer; 18, water inlet pump; 19, guide plate; and 20, defoaming micro tooth.

DETAILED DESCRIPTION OF THE INVENTION

The following clearly and completely describes the technical solution in the embodiments of the present disclosure with reference to the embodiments of the present disclosure. Apparently, the described embodiments are merely a part rather than all of the embodiments of the present disclosure. Based on the embodiments in the present disclosure, all other embodiments obtained by those skilled in the art under the premise of without contributing creative efforts belong to the scope protected by the present disclosure.

As shown in FIG. 1, the embodiment provides an inclined plate baffled A2O reactor with high oxygen transfer efficiency, including a reactor body and a secondary sedimentation tank 10. The reactor body includes an anaerobic zone 2, an anoxic zone 16 and a deep oxic zone 13 which are arranged sequentially from top to bottom. An anaerobic-anoxic inclined plate 3 is arranged between the anaerobic zone 2 and the anoxic zone 16. An end of the anaerobic-anoxic inclined plate 3 is connected with an inner wall of a side of the reactor body. An anaerobic-anoxic communicating port is arranged between another end of the anaerobic-anoxic inclined plate 3 and an inner wall of another side of the reactor body. The anaerobic-anoxic communicating port is configured for communicating the anaerobic zone 2 with the anoxic zone 16. An anoxic-oxic inclined plate 14 is arranged between the anoxic zone 16 and the deep oxic zone 13. An end of the anoxic-oxic inclined plate 14 is connected with the inner wall of another side of the reactor body. An anoxic-oxic communicating port is arranged between another end of the anoxic-oxic inclined plate 14 and the inner wall of the side of the reactor body. The anoxic-oxic communicating port is configured for communicating the anoxic zone 16 and the deep oxic zone 13. An side, away from the anoxic-oxic communicating port, of the deep oxic zone 13 extends upwards to a top of the reactor body to form an oxic zone 4. A water inlet is provided at a side of an upper part of the anaerobic zone 2. A water inlet pump 18 and a first flow meter 1 are arranged between the water inlet and the anaerobic zone 2. A first plug-flow stirrer 17 is arranged on the side of the upper part of the anaerobic zone 2 below the water inlet. A second plug-flow stirrer 15 is arranged on the inner wall of another side of the reactor body below the anaerobic-anoxic communicating port. The second plug-flow stirrer 15 is located below the anaerobic-anoxic communicating port. The oxic zone 4 communicates with the secondary sedimentation tank 10 through a gravity pipeline. Microporous aerators 12 are arranged at a bottom of the deep oxic zone 13. The microporous aerators 12 communicate with an air outlet end of a deepwater aeration pump 9.

In the embodiment, a nitrification liquid reflux branch is arranged on the gravity pipeline, An end of the nitrification liquid reflux branch is connected with the gravity pipeline, and another end of the nitrification liquid reflux branch extends to the anaerobic-anoxic communicating port.

A second flow meter 5 and a second reflux pump 11 are arranged on the nitrification liquid reflux branch.

A sludge discharge pipe is arranged at a bottom of the secondary sedimentation tank 10, and a sludge discharge valve 8 is arranged on the sludge discharge pipe. A sludge reflux pipeline is arranged on the sludge discharge pipe above the sludge discharge valve 8. An end of the sludge reflux pipeline is connected with the sludge discharge pipe, and another end of the sludge discharge pipeline extends to the water inlet of the anaerobic zone 2.

A third flow meter 6 and a first reflux pump 7 is arranged on the sludge reflux pipeline.

The anoxic-oxic inclined plate 14 is arranged obliquely downward from the side to another side of the reactor body. An included angle between the anoxic-oxic inclined plate 14 and a horizontal plane is 15°-35°, and is set to be 250 in the embodiment. An exhaust port is arranged below a higher end of the anaerobic-anoxic inclined plate 3, namely a top of the anoxic zone 16. The exhaust port communicates with a nitrogen recovery device.

The anoxic-oxic inclined plate 14 is arranged obliquely downward from another side to the side of the reactor body. An included angle between the anoxic-oxic inclined plate 14 and a horizontal plane is 15°-35°, and is set to be 25° in the embodiment.

In a more specific embodiment, the volume ratio of the anaerobic zone 2, the anoxic zone 16, and the deep oxic zone 13 is 1:2:4.

In a further embodiment, a guide plate 19 is arrange on a lower end of the anoxic-oxic inclined plate 14. A top of the guide plate 19 is connected with the lower end of the anoxic-oxic inclined plate 14. The guide plate 19 guides sludge-water mixture from the anoxic zone to the bottom of the deep oxic zone to avoid the occurrence of short flow phenomenon of the sludge-water mixture entering the oxic zone. Defoaming micro teeth 20 are arranged on a lower surface of the anoxic-oxic inclined plate 14. The defoaming micro-teeth 20 cut floating bubbles in the aerobic area multiple times and break the floating bubbles into micro bubbles with smaller particle size, so that the air-liquid contact area is increased, the oxygen transfer rate is improved, and the energy consumption of the oxygen transfer is reduced.

The anaerobic zone 2 is located at an uppermost layer of the integrated reactor, and water flows into the anaerobic zone 2 and is mixed with reflux activated sludge through the first plug-flow stirrer 17 to complete phosphorus release in the anaerobic zone 2. The anoxic zone 16 is located in the second layer of the integrated reactor, and the nitrification liquid refluxed from the oxic zone 4 is mixed with the sludge-water mixture flowing from the anaerobic zone 2 through the second plug-flow stirrer 15 to complete denitrification in the anoxic zone 16. The microporous aerators 12 of the deep oxic zone 13 are arranged at a depth of 8 meters of water, oxygen is supplied by the deepwater aeration pump 9, and smaller bubble particles are released to increase the mass transfer area of the air-liquid contact. A larger deep water pressure can increase the oxygen transfer rate to 4%, and sufficient dissolved oxygen can accelerate the metabolic activities of microorganisms, so that the efficiency of aerobic phosphorus removal, nitrification and organic matter degradation can be increased, and the operation cost is significantly reduced compared with the traditional equipment. In the integrated reactor, the inclined plates, namely the anaerobic-anoxic inclined plate 3 and the anoxic-oxic inclined plate 14, with an inclination angle of 25° are designed as baffles for separating the anaerobic zone 2, the anoxic zone 16 and the deep oxic zone 13. The anaerobic-anoxic inclined plate 3 and the anoxic-oxic inclined plate 14 are configured for reducing the retention of activated sludge and prevent the inclined plates from being decayed. The anoxic zone 16 is a core reaction zone for denitrification. The nitrification liquid containing a large amount of $NO^{3-}$—N is refluxed from the oxic zone 4 to the anoxic zone 16, and $NO^{3-}$—N is converted into $N_2$ under the action of denitrifying bacteria. The produced gases such as $N_2$, $CO_2$ and $CH_4$ are discharged through the anaerobic-anoxic inclined plate 3 and the exhaust port arranged in the anoxic zone 16, and can be collected and purified by a nitrogen purification and collection device to realize resource utilization. The inclined plate between the anoxic zone 16 and the oxic zone 4 has the function of gas-liquid (solid) separation. The untransferred oxygen and the produced gas in the aeration tank escape through the designed anoxic-oxic inclined plate 14 and the oxic zone 4 on the right, without affecting the environmental condition of the anaerobic zone 2 or the anoxic zone 16. A semi-circular arc designed at an end of the inclined plate can effectively prevent the sludge-water mixture from flowing back from the lower layer to the upper layer, without interfering with the environmental conditions of the anoxic zone 16 and the anaerobic zone 2. The plug-flow stirrers are arranged at the water inlet ends of the anaerobic zone 2 and the anoxic zone 16, with the purpose of forming horizontal push flow force to fully mix sludge and water. Generally speaking, the sludge reflux ratio is designed to be 50%, and the nitrification liquid reflux ratio is designed to be 100% to 200%. The secondary sedimentation tank 10 is designed as a common vertical sedimentation tank. The floor area of the inclined plate baffled A2O reactor with high oxygen transfer efficiency of the present disclosure is reduced to only half of that of the traditional A2O, and the infrastructure cost is significantly reduced due to the significant reduction in the floor area.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is limited by the claims appended hereto, therefore, all changes, including the meanings and scopes of equivalent elements, of the claims are aimed to be included in the present disclosure, and any mark of attached figures in the claims should not be regarded as limitation to the involved claims.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In summary, the contents of this specification should not be understood as the limitation of the present disclosure.

What is claimed is:

1. An inclined plate baffled Anaerobic-Anoxic-Oxic (A2O) reactor with high oxygen transfer efficiency, comprising; a reactor body, and a secondary sedimentation tank, wherein the reactor body comprises an anaerobic zone, an anoxic zone and a deep oxic zone which are arranged sequentially from top to bottom; an anaerobic-anoxic inclined plate is arranged between the anaerobic zone and the anoxic zone; a first end of the anaerobic-anoxic inclined plate is connected with an inner wall of a first side of the reactor body, an anaerobic-anoxic communicating port is arranged between a second end of the anaerobic-anoxic inclined plate and an inner wall of a second side of the reactor body, and the anaerobic-anoxic communicating port is configured for communicating the anaerobic zone with the anoxic zone; an anoxic-oxic inclined plate is arranged between the anoxic zone and the deep oxic zone; a first end of the anoxic-oxic inclined plate is connected with the inner wall of the second side of the reactor body, an anoxic-oxic communicating port is arranged between a second end of the anoxic-oxic inclined plate and the inner wall of the first side of the reactor body, the anoxic-oxic communicating port is connected with a guide plate, the guide plate is configured for guiding sludge-water mixture to a bottom of the deep oxic zone to avoid an occurrence of short flow phenomenon of the sludge-water mixture in the oxic zone, and the anoxic-oxic communicating port is configured for communicating the anoxic zone with the deep oxic zone; a first side, away from the anoxic-oxic communicating port, of the deep oxic zone extends upwards to a top of the reactor body to form an oxic zone; a water inlet is provided at a first side of an upper part of the anaerobic zone; a first plug-flow stirrer is arranged at the first side of the upper part of the anaerobic zone below the water inlet; a second plug-flow stirrer is arranged on the inner wall of the second side of the reactor body below the anaerobic-anoxic communicating port; the oxic zone communicates with the secondary sedimentation tank through a gravity pipeline; and microporous aerators are arranged at the bottom of the deep oxic zone, and the microporous aerators communicate with an air outlet end of a deepwater aeration pump.

2. The inclined plate baffled A2O reactor with high oxygen transfer efficiency according to claim 1, wherein a nitrification liquid reflux branch is arranged on the gravity pipeline, a first end of the nitrification liquid reflux branch is connected with the gravity pipeline, and the second end of the nitrification liquid reflux branch extends to the anaerobic-anoxic communicating port.

3. The inclined plate baffled A2O reactor with high oxygen transfer efficiency according to claim 2, wherein a second flow meter and a second reflux pump are arranged on the nitrification liquid reflux branch.

4. The inclined plate baffled A2O reactor with high oxygen transfer efficiency according to claim 1, wherein a sludge discharge pipe is arranged at a bottom of the secondary sedimentation tank, and a sludge discharge valve is arranged on the sludge discharge pipe; a sludge reflux pipeline is arranged on the sludge discharge pipe above the sludge discharge valve; and a first end of the sludge reflux pipeline is connected with the sludge discharge pipe, and a second end of the sludge reflux pipeline extends to the water inlet of the anaerobic zone.

5. The inclined plate baffled A2O reactor with high oxygen transfer efficiency according to claim 4, wherein a third flow meter and a first reflux pump is arranged on the sludge reflux pipeline.

6. The inclined plate baffled A2O reactor with high oxygen transfer efficiency according to claim 1, wherein the anoxic-oxic inclined plate is arranged obliquely downward from the first side to the second side of the reactor body.

7. The inclined plate baffled A2O reactor with high oxygen transfer efficiency according to claim 6, wherein an included angle between the anoxic-oxic inclined plate and a horizontal plane is 15°-35°.

8. The inclined plate baffled A2O reactor with high oxygen transfer efficiency according to claim 1, wherein the anoxic-oxic inclined plate is arranged obliquely downward from the second side to the first side of the reactor body.

9. The inclined plate baffled A2O reactor with high oxygen transfer efficiency according to claim 8, wherein an included angle between the anoxic-oxic inclined plate and a horizontal plane is 15°-35°.

10. The inclined plate baffled A2O reactor with high oxygen transfer efficiency according to claim 1, wherein a water inlet pump and a first flow meter are arranged between the water inlet and the anaerobic zone.

* * * * *